US010991145B2

United States Patent
Yu et al.

(10) Patent No.: US 10,991,145 B2
(45) Date of Patent: Apr. 27, 2021

(54) POSE-VARIANT 3D FACIAL ATTRIBUTE GENERATION

(71) Applicant: NEC Laboratories America, Inc., Princeton, NJ (US)

(72) Inventors: Xiang Yu, Mountain View, CA (US); Feng-Ju Chang, Alhambra, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 0 days.

(21) Appl. No.: 16/673,256

(22) Filed: Nov. 4, 2019

(65) Prior Publication Data

US 2020/0151940 A1 May 14, 2020

Related U.S. Application Data

(60) Provisional application No. 62/760,135, filed on Nov. 13, 2018.

(51) Int. Cl.
  *G06T 15/04* (2011.01)
  *G06K 9/00* (2006.01)
  *G06T 15/00* (2011.01)

(52) U.S. Cl.
  CPC .......... *G06T 15/04* (2013.01); *G06K 9/00228* (2013.01); *G06K 9/00288* (2013.01); *G06T 15/005* (2013.01)

(58) Field of Classification Search
  None
  See application file for complete search history.

(56) References Cited

U.S. PATENT DOCUMENTS

| 10,796,476 | B1* | 10/2020 | Xing | G06T 15/08 |
| 2019/0066369 | A1* | 2/2019 | Peng | G06T 15/20 |
| 2019/0213772 | A1* | 7/2019 | Lombardi | G06T 15/205 |

OTHER PUBLICATIONS

Deng et al, 'UV-GAN: Adversarial Facial UV Map Completion for Pose-invariant Face Recognition', arXiv:1712.04695v1 [cs.CV], Dec. 13 (Year: 2017).*

Jackson et al, 'Large Pose 3D Face Reconstruction from a Single Image via Direct Volumetric CNN Regression', 2017 IEEE Intl. Conf. on Computer Vision, pp. 1031-1039. (Year: 2017).*

(Continued)

*Primary Examiner* — Patrick F Valdez
(74) *Attorney, Agent, or Firm* — Joseph Kolodka

(57) ABSTRACT

A system is provided for pose-variant 3D facial attribute generation. A first stage has a hardware processor based 3D regression network for directly generating a space position map for a 3D shape and a camera perspective matrix from a single input image of a face and further having a rendering layer for rendering a partial texture map of the single input image based on the space position map and the camera perspective matrix. A second stage has a hardware processor based two-part stacked Generative Adversarial Network (GAN) including a Texture Completion GAN (TC-GAN) stacked with a 3D Attribute generation GAN (3DA-GAN). The TC-GAN completes the partial texture map to form a complete texture map based on the partial texture map and the space position map. The 3DA-GAN generates a target facial attribute for the single input image based on the complete texture map and the space position map.

18 Claims, 3 Drawing Sheets

(56) References Cited

OTHER PUBLICATIONS

Souza et al, 'GAN-Based Realistic Face Pose Synthesis with Continuous Latent Code', FLAIRS-31, pp. 110-115, May. (Year: 2018).*
Huang et al, 'Stacked Generative Adversarial Networks', arXiv:1612.04357v4 [cs.CV], Apr. 12 (Year: 2017).*
Newell et al, 'Stacked Hourglass Networks for Human Pose Estimation, arXiv: 16003.06937v2 [cs.CV], Jul. 26 (Year: 2016).*
Choi et al, 'StarGAN: Unified Generative Adversarial Networks for Multi-Domain Image-to-Image Translation', arXiv:1711.09020v3 [cs.CV], Sep. 21 (Year: 2018).*
Isola et al, 'Image-to-Image Translation with Conditional Adversarial Networks', arXiv:1611.07004v2 [cs.CV], Nov. 22 (Year: 2017).*
Richardson et al, 'Learning Detailed Face Reconstruction from a Single Image', arXiv:1611.05053v2, Apr. 6 (Year: 2017).*
He et al, 'AttGAN: Facial Attribute Editing by Only Changing What You Want', arXiv:1711.10678v3 [cs.CV], Jul. 25 (Year: 2018).*
Choi et al., "StarGAN: Unified Generative Adversarial Networks for Multi-Domain Image-to-Image Translation", CVF, Jun. 2018, pp. 8789-8797.
He et al., AttGAN: Facial Attribute Editing by Only Changing What You Want, arXiv:1711.10678v3 [cs.CV] Jul. 25, 2018, pp. 1-16.
She et al., "Learning Residual Images for Face Attribute Manipulation", CVF, Jun. 2018, pp. 4030-4038.

* cited by examiner

POSE-VARIANT 3D FACIAL ATTRIBUTE GENERATION

RELATED APPLICATION INFORMATION

This application claims priority to U.S. Provisional Patent Application Ser. No. 62/760,135, filed on Nov. 13, 2018, incorporated herein by reference herein its entirety.

BACKGROUND

Technical Field

The present invention relates to facial recognition and more particularly to pose variant 3D facial attribute generation.

Description of the Related Art

Recognizing a face can be a daunting task due to pose-variance. Accordingly, there is a need for a way to generate pose variant 3D facial attributes.

SUMMARY

According to an aspect of the present invention, a system is provided for pose-variant 3D facial attribute generation. The system includes a first stage having a hardware processor based 3D regression network for directly generating a space position map for a 3D shape and a camera perspective matrix from a single input image of a face and further having a rendering layer for rendering a partial texture map of the single input image based on the space position map and the camera perspective matrix. The system further includes a second stage having a hardware processor based two-part stacked Generative Adversarial Network (GAN) including a Texture Completion GAN (TC-GAN) stacked with a 3D Attribute generation GAN (3DA-GAN). The TC-GAN is for completing the partial texture map to form a complete texture map based on the partial texture map and the space position map. The 3DA-GAN is for generating a target facial attribute for the single input image based on the complete texture map and the space position map.

According to another aspect of the present invention, a computer-implemented method is provided for pose-variant 3D facial attribute generation. The method includes directly generating, by a hardware processor using a 3D regression network, a space position map for a 3D shape and a camera perspective matrix from a single input image of a face. The method further includes rendering, by the hardware processor using a rendering layer, a partial texture map of the single input image based on the space position map and the camera perspective matrix. The method also includes completing, by the hardware processor using a Texture Completion Generative Adversarial Network (TC-GAN), the partial texture map to form a complete texture map based on the partial texture map and the space position map. The method additionally includes generating, by the hardware processor using a 3D Attribute generation GAN (3DA-GAN), a target facial attribute for the single input image based on the complete texture map and the space position map.

According to still another aspect of the present invention, a computer program product is provided for pose-variant 3D facial attribute generation. The computer program product includes a non-transitory computer readable storage medium having program instructions embodied therewith. The program instructions are executable by a computer to cause the computer to perform a method. The method includes directly generating, by a hardware processor using a 3D regression network, a space position map for a 3D shape and a camera perspective matrix from a single input image of a face. The method further includes rendering, by the hardware processor using a rendering layer, a partial texture map of the single input image based on the space position map and the camera perspective matrix. The method also includes completing, by the hardware processor using a Texture Completion Generative Adversarial Network (TC-GAN), the partial texture map to form a complete texture map based on the partial texture map and the space position map. The method additionally includes generating, by the hardware processor using a 3D Attribute generation GAN (3DA-GAN), a target facial attribute for the single input image based on the complete texture map and the space position map.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to pose variant 3D facial attribute generation.

Embodiments of the present invention target generating facial attributes for a pose-variant face image from an in-the-wild situation. The method is based on a 3D representation other than the traditional 2D image. The framework can deal with large pose variation inputs, and inpainting desired facial attributes, such as beards, smiles, sunglasses, on top of the original input. This is very helpful as it provides an important way to augment face data for many applications, such as face recognition and face editing. Of course, the present invention can be used for other applications based on the teachings of the present invention provided herein.

In an embodiment, it is proposed to disentangle the task into two primary stages as follows. The first stage involves an hourglass-based deep dense regression with a differential rendering layer to directly achieve a 3D shape and a weak perspective matrix from a single input image, and utilize the information to render a partial texture representation due to pose-variance caused self-occlusion. The second stage involves a two-step stacked Generative Adversarial Network (GAN). The first-step is a Texture Completion GAN (TC-GAN), utilizing both 3D shape and partial texture obtained from the first stage to complete the texture map. The second step is a 3D Attribute generation GAN (3DA-GAN), generating target attributes onto the completed 3D texture representation. In the first stage, we apply the UV representation for both 3D point cloud and the texture, termed $UV_{pos}$ and $UV_{tex}$ respectively. The UV representation provides the dense shape information and also builds the one-to-one correspondence from point cloud to the texture. In the second stage, the TC-GAN and the 3DA-GAN are two functionally independent tasks with independent objectives. The 3DA-GAN receives the output from the TC-GAN as input for attribute generation, hence forming the stacked configuration. The stacked two GANs take both the $UV_{pos}$ and $UV_{tex}$ as input because the completed texture and the newly generated attribute are 3D shape correlated.

Figure 1:
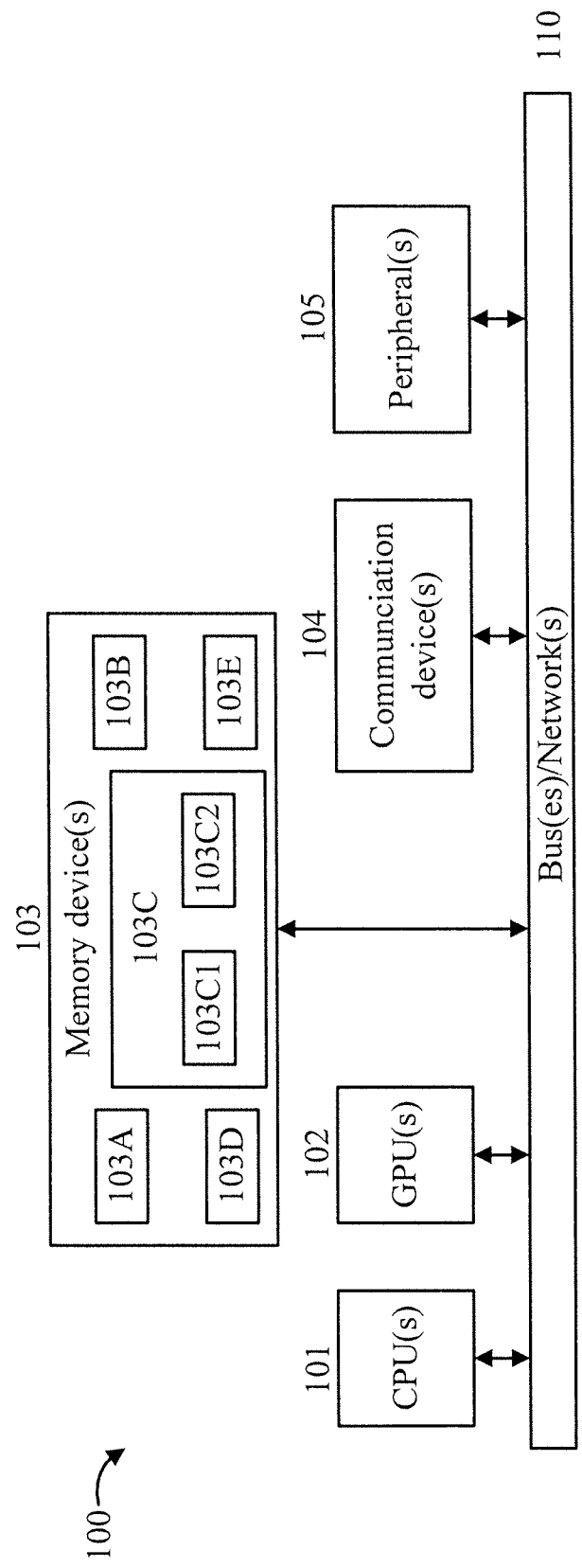
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device (e.g., a RGBD imaging device, etc.), a microphone, a speaker, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, the memory devices 103 can store code for implementing one or more of the following: a 3D regression network 103A; a rendering layer 103B; a 2-step stacked Generative Adversarial Network (GAN) 103C having a Texture Completion GAN (TC-GAN) 103C1 stacked with a 3D Attribute generation GAN (3DA GAN) 103C2, a facial recognition system 103D, and a facial editing system 103E. These and other elements described herein can be implemented at least in part by memory devices 103.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

Figure 2:
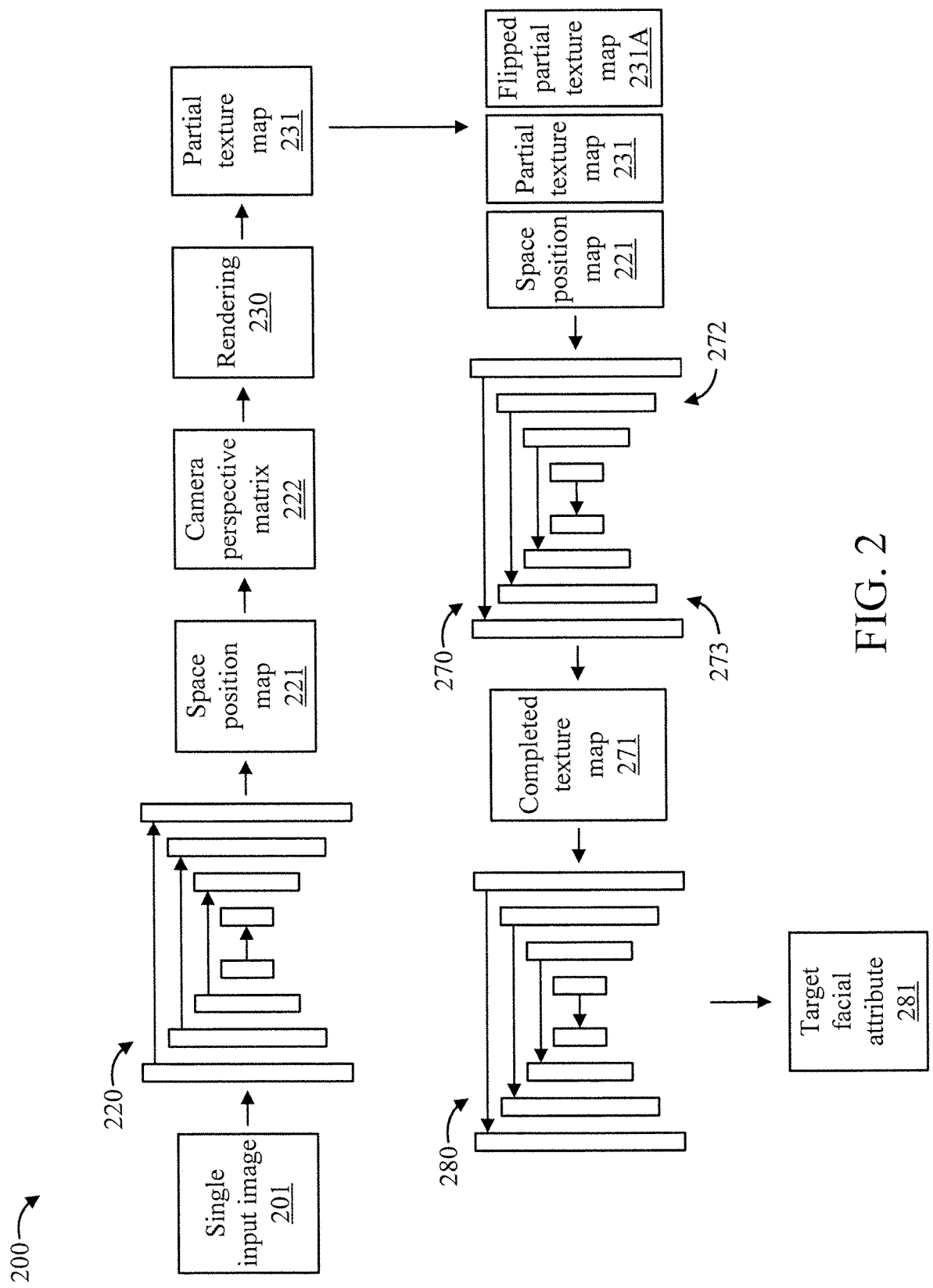
FIG. 2 is a block diagram showing an exemplary system for pose-variant 3D facial attribute generation, in accordance with an embodiment of the present invention.

FIG. 2 is a block diagram showing an exemplary system 200 for pose-variant 3D facial attribute generation, in accordance with an embodiment of the present invention.

The system 200 includes a first stage 210 and a second stage 250.

The first stage 210 has a 3D regression network 220 for directly generating a space position map 221 for a 3D shape and a camera perspective matrix 222 from a single input image 201 of a face.

The first stage 210 further has a rendering layer 230 for rendering a partial texture map 231 of the single input image 201 based on the space position map 221 and the camera perspective matrix 222.

The second stage 250 has a two-part stacked Generative Adversarial Network (GAN) 260. The two-part stacked GAN 260 includes a Texture Completion GAN (TC-GAN) stacked 270 with a 3D Attribute generation GAN (3DA-GAN) 280.

The TC-GAN 270 is for completing the partial texture map 231 to form a complete texture map 271 based on the partial texture map 231, a flipped version of the partial texture map 231A, and the space position map 221.

The 3DA-GAN 280 is for generating a target facial attribute 281 for the single input image 201 based on the complete texture map 271 and the space position map 221.

In an embodiment, an encoder-decoder structure having an encoder 272 and a decoder 273 is provided as the backbone of TC-GAN 270. Such a structure can also be present in the regression network 220 and the 3DA-GAN 280. In a non-limiting embodiment, both the encoder 272 and decoder 273 have four blocks. Each block of the encoder 272 includes a convolutional layer followed by a batch normalization layer and a ReLU layer. Similarly, each block of the decoder 273 includes a deconvolutional layer followed by a batch normalization layer and a leaky ReLU layer. The input for encoder 272 as in FIG. 2, is the concatenation of a partial texture map, a flipped partial texture map, and the space position map. The output for encoder 272 is the intermediate feature generated from 272. The input for decoder 273 is the intermediate feature output from encoder 272, and the output for the decoder 273 is the completed texture map 271. Skip links are set up connecting the encoder and decoder in a symmetrical way, i.e. the first block of the encoder is shared to the last block of the decoder. It has been found that skip links play an important role in preserving the high frequency information, especially from the lower layers which preserve more low-level information.

Figure 3:
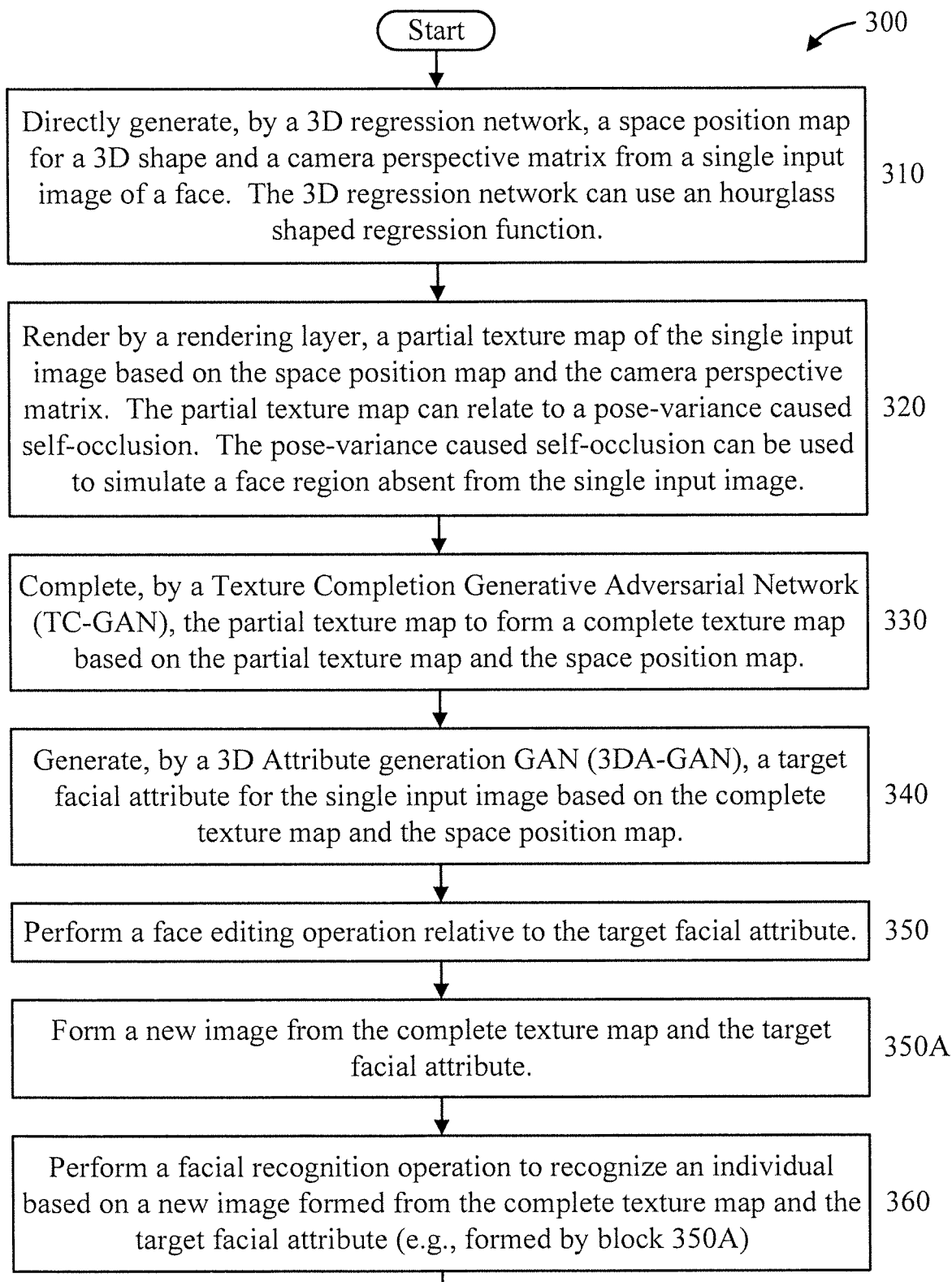
FIG. 3 is a flow diagram showing an exemplary method for pose-variant 3D facial attribute generation, in accordance with an embodiment of the present invention.

FIG. 3 is a flow diagram showing an exemplary method for pose-variant 3D facial attribute generation, in accordance with an embodiment of the present invention.

At block 310, directly generate, by a 3D regression network, a space position map for a 3D shape and a camera perspective matrix from a single input image of a face. In an embodiment, the 3D regression network can use an hourglass shaped regression function.

At block 320, render, by a rendering layer, a partial texture map of the single input image based on the space position map and the camera perspective matrix. In an embodiment, the partial texture map can relate to a pose-variance caused self-occlusion. In an embodiment, the pose-variance caused self-occlusion can be used to simulate a face region absent from the single input image.

At block 330, complete, by a Texture Completion Generative Adversarial Network (TC-GAN), the partial texture map to form a complete texture map based on the partial texture map and the space position map.

At block 340, generate, by a 3D Attribute generation GAN (3DA-GAN), a target facial attribute for the single input image based on the complete texture map and the space position map.

At block 350, perform a face editing operation relative to the target facial attribute.

In an embodiment, block 350 can include block 350A.

At block 350A, form a new image from the complete texture map and the target facial attribute. For example, the complete texture map can be of a clean shaven man, and the target facial attribute can be a beard that is added to the man in the complete texture map.

At block 360, perform a facial recognition operation to recognize an individual based on a new image formed from the complete texture map and the target facial attribute (e.g., formed by block 350A), and the space position map. In this way, different poses and different facial attributes of a same person can be generated and used to identify that person.

Thus, the present invention introduces a dense 3D representation that supports latter appearance generation. Then, rendering is conducted to generate visible appearance from the original input. Further, a texture completion GAN is presented to achieve fully visible texture map. In the end, a 3D attribute generation GAN is proposed to directly work on the 3D position and texture representation and output an attribute perturbed appearance with fully controlled pose geometry.

A description will now be given regarding UV position map regression, in accordance with an embodiment of the present invention.

To faithfully render the visible appearance, we seek a dense 3D reconstruction of shape and texture.

Assume 3D point cloud $S \in R^{N \times 3}$, N is the number of vertices. Each vertex $s=(x, y, z)$ consists of the three dimensional coordinates in image space. $(u, v)$ are defined as follows:

$$u = \arccos\left(\frac{x}{\sqrt{x^2+z^2}}\right), v = 1 - \frac{1}{\pi}\arccos(y) \qquad (1)$$

Equation 1 establishes a unique mapping from a dense point cloud to the UV maps. By quantizing the UV space with different granularity, one can control the density of UV space versus the image resolution. In this work, we quantize the UV maps into 256×256 and thus preserves 65k vertices. A UV position map $UV_{pos}$ is defined on the UV space, each entry is the corresponding three dimensional coordinate (x, y, z). A UV texture map $UV_{tex}$ is also defined on the UV space, each entry is the corresponding coordinate's RGB color.

Based on the UV space definition, we propose a deep regression from input to $UV_{pos}$ instead of the original dense point cloud. Simultaneously we conduct the pose estimation by regressing the weak perspective matrix $W \in \mathbb{R}^{3 \times 4}$. Denoting the deep regression as a nonlinear function $\Phi$, the input image I, the objective is as follows:

$$\underset{\Phi, W}{\operatorname{argmin}}\{\|\Phi(I) - UV_{pos}^*\|_1 + \|W - W^*\|_2 + \|W^* L W^{*-1} \Phi(I) - LS^*\|_2\} \qquad (2)$$

The first two terms in Equation 2 are regular supervised loss for the predicted UV map $\Phi(i) \in \mathbb{R}^{256 \times 256 \times 3}$ and the weak perspective matrix W. $UV^*$, $W^*$ and $s^*$ are denoted as the corresponding ground truth. The third term looks into the predefined facial landmarks. The landmark coordinates predicted by the UV map should be close to the ground truth as well. In practice, we find that small UV map error does not guarantee small landmark error. It is because the dense point cloud has certain amount of ambiguity when mapping to the sparse landmarks. To more strictly constrain the shape regression, we introduce an indexing vector $L \in \mathbb{R}^{1 \times N}$, whose entry is 1 if the corresponding vertex is selected otherwise 0. Notice that $\Phi(I)$ is pose-specific and we need to transfer it back to a reference pose by applying $W^{*-1}$. Suppose W=[R|T] consists of a rotation matrix $R \in \mathbb{R}^{3 \times 1}$ and a translation vector T 2 R3×1. We set $W^{*-1}$ as $[R^{*-1}|-T]$. When calculating the third term, we reshape original $\Phi(i)$ in to $\mathbb{R}^{N \times 3}$.

A description will now be given regarding UV texture map rendering, in accordance with an embodiment of the present invention. The $UV_{tex}$ of a pose-variant face is with partially visible appearance. This is because the self-occlusion caused by pose variation generates the invisible face region. In the original coordinate space, we conduct a z-Buffering algorithm to label the visible condition of each 3D vertex. Those vertices with largest depth information are visible while all others are invisible. Assume the visibility vector M with entry 1 means visible and 0 invisible. The rendering is a lookup operation by associating the specific coordinate's color to the corresponding UV coordinate. We formulate the process in Equation 3 as follows:

$$UV_{tex}(u,v) = I(x,y) \odot M(x,y,z) \qquad (3)$$

where $(u, v)$ is determined by Equation 1.

A description will now be given regarding the UV texture map completion, in accordance with an embodiment of the present invention.

The incomplete $UV_{tex}$ from the rendering is not sufficient to conduct the attribute generation as the invisible region introduces artifacts. We seek a texture completion that can provide not only photo-realistic appearance recovery but also the identity preservation. UV-GAN proposes a similar framework to complete the UV texture map by applying an adversarial network. However, it only considers the texture information. We argue that for 3D UV representation, completing the appearance should consider both texture information and the shape information. For example, combining the original and flipped input will provide a good initialization for appearance prediction. But it only applies the symmetry constraint on shape, which is not sufficient to preserve the shape information. Thus, we take $UV_{pos}$, $UV_{tex}$ and flipped $UV_{tex}$ as the input. We design an Encoder-Decoder structure as the backbone of TC-GAN. Both the encoder and decoder are with four blocks. Each block of the encoder includes a convolutional layer followed by a batch normalization layer and a ReLU layer. Similarly, each block of the decoder includes a deconvolutional layer followed by a batch normalization layer and a leaky ReLU layer. Skip links are set up connecting the encoder and decoder in a symmetrical way, i.e., the first block of the encoder is shared to the last block of the decoder. We find that skip links play an important role in preserving the high frequency information, especially from the lower layers which preserve more low-level information.

A description will now be given of a reconstruction module, in accordance with an embodiment of the present invention.

With 3D dense point cloud reconstruction proposed, we actually can prepare the ground truth of this task without any labeling. We start with near-frontal face images where all the pixels are visible. Then, we perturb the head pose of this original image with random angle. Note that all the pose variant images share the same frontal ground truth which is the original image. By the introduced rendering, we obtain the incomplete texture map for the input. Since ground truth is provided, we propose the supervised reconstruction loss to guide the completion as follows:

$$L_{recon} = \|G_{tc}(I, \tilde{I}, UV_{pos}) - I^*\|_1 \quad (4)$$

$G_{tc}(\cdot)$ denotes the generator that includes the encoder and decoder. I denotes the input, $\tilde{I}$ denotes the flipped input, and I* denotes the complete ground truth of the input. Merely relying on reconstruction cannot guarantee high quality result because the L2 or L1 loss usually brings in blurry effect. Thus, we introduce an adversarial training to improve the generation quality.

A description will now be given regarding the discriminator module, in accordance with an embodiment of the present invention.

Given the ground truth images as positive samples $I^* \in R$ and $G_{tc}$ generated samples as negative ones, we train a discriminator D with the following objective.

$$\arg\min_D L_D = -\mathbb{E}_{I^* \in R}\log(d(I^*)) - \\ \mathbb{E}_{G_{tc}(I,\tilde{I},UV_{pos}) \in F}\log(1 - D(G_{tc}(I, \tilde{I}, UV_{pos}))) \quad (5)$$

A description will now be given regarding the generator module, in accordance with an embodiment of the present invention.

Following the adversarial training, $G_{tc}$ aims to fool D and thus push the objective to the other direction.

$$L_{adv} = -\mathbb{E}_{G_{tc}(I,\tilde{I},UV_{pos}) \in F}\log(D(G_{tc}(I,\tilde{I},UV_{pos}))) \quad (6)$$

A description will now be given regarding a smoothness term, in accordance with an embodiment of the present invention.

To remove the artifact, we propose to apply the total variation loss to locally constrain the smoothness of the output as follows:

$$L_{tv} = \frac{1}{|II|}\Sigma|\nabla G_{tc}(I, \tilde{I}, UV_{pos})| \quad (7)$$

$\nabla G_{tc}(I, \tilde{I}, UV_{pos})$ is the gradient of the output. |II| is the number of entries of input image, which is equivalent to the number of output entries. To preserve identity, as most of the works do, we need to introduce a face recognition engine to guarantee that the recognition feature from the generated image is close to the feature from the ground truth image. In practice, we find that the reconstruction constraint in Equation 4 is sufficient to preserve the identity in this task. Thus, the overall loss for TC-GAN is summarized as follows:

$$L_{TCGAN} = \lambda_{recon}L_{recon} + \lambda\text{adv}L_{adv} + \lambda_{tv}L_{tv}, \quad (8)$$

Weight balance is empirically set as $\lambda_{recon}=1$, $\lambda_{adv}=0.1$, $\lambda_{tv}=0.05$, respectively.

A description will now be given regarding 3D Face Attribute Generation, in accordance with an embodiment of the present invention.

We introduce the 3D representation, the completed UVtex and UVpos, as the input. We believe that introducing 3D geometric information can better synthesize an attribute, i.e., with 3D shape information, sunglasses will be generated as surface. We formulate the target attribute generation as a conditional GAN framework, by inserting the attribute code p into the data flow. We manually select 8 out of 40 exemplary attributes that are merely reflecting the facial region and are uncorrelated to the face identity, i.e., sunglass (SG), mouth open (MO), wear lipstick (LS), 5' o clock shadow (SH), smile (SM), eyebags (EB), pale skin (PS) and bangs (BA). Thus, $p \in \mathbb{R}^8$, each element stands for one attribute, with 1 as with the attribute 0 without. The hourglass is applied as the structure of $G_{attr}$. Encoder and decoder are with four blocks each, similar setting as in TC-GAN. The attribute code p is convoluted with two blocks and then concatenated to the third block of the encoder of $G_{attr}$.

Our training procedure can be divided into two phases:

(1) Reconstruction. Assuming input $UV_{tex}$, $UV_{pos}$ and the ground truth p, output the reconstructed $\hat{UV}_{tex}$, $\hat{UV}_{pos}$ with exactly the same attributes in p.

(2) Attribute perturbed generation. At this stage, we flip one attribute per time of p, considering flipping from 0 to 1, aka generating attribute other than eliminating attribute. The input is still $UV_{tex}$, $UV_{pos}$ and the perturbed p' whose hamming distance to p is exactly one. The output is the perturbed $\hat{UV}_{tex}$, $\hat{UV}_{pos}$, exhibiting the newly generated attribute indicated by the flipped bit in p', where all other parts should be preserved. The purpose of setting up phase (1) is because we consider per-attribute generation, where most of the non-attribute related area should remain the same. Conducting the reconstruction first will largely benefit this procedure while phase (2) can focus only on the local perturbation. Further, it guarantees that the perturbed attribute only determines the newly generated attribute area by contrasting these two phases.

We introduce the loss design by abstracting functionally same components, which are mostly shared by the two phases procedure.

The present invention may be a system, a method, and/or a computer program product at any possible technical detail level of integration. The computer program product may include a computer readable storage medium (or media) having computer readable program instructions thereon for causing a processor to carry out aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for pose-variant 3D facial attribute generation, comprising:
    a first stage having a hardware processor based 3D regression network for directly generating a space position map for a 3D shape and a camera perspective matrix from a single input image of a face and further having a rendering layer for rendering a partial texture map of the single input image based on the space position map and the camera perspective matrix; and
    a second stage having a hardware processor based two-part stacked Generative Adversarial Network (GAN) comprising a Texture Completion GAN (TC-GAN) stacked with a 3D Attribute generation GAN (3DA-GAN), the TC-GAN for completing the partial texture map to form a complete texture map based on the partial texture map and the space position map, the 3DA-GAN for generating a target facial attribute for the single input image based on the complete texture map and the space position map,
    wherein an indexing vector, relating to a use of a particular vertex from among multiple vertexes, is used to constrain a regression shape.

2. The system of claim 1, wherein the partial texture representation relates to a pose-variance caused self-occlusion.

3. The system of claim 1, wherein the pose-variance caused self-occlusion is used to simulate a face region absent from the single input image.

4. The system of claim 1, further comprising a recognition stage for recognizing a person based on the target facial attribute.

5. The system of claim 1, wherein the TC-GAN completes the partial texture map to form the complete texture map by jointly processing the partial texture map and the space position map.

6. The system of claim 5, wherein the TC-GAN completes the partial texture map to form the complete texture map using a non-flipped and a flipped version of the partial texture map.

7. The system of claim 1, further comprising synthesizing an image from the complete texture map and the space position map, the image having the face with the target facial attribute rendered thereon.

8. The system of claim 1, wherein the system is a facial recognition system.

9. The system of claim 1, wherein the system is a facial editing system.

10. The system of claim 1, wherein the 3D regression network uses an hourglass shaped regression function.

11. The system of claim 1, wherein the TC-GAN and the 3DA-GAN are functionally independent tasks with independent objectives.

12. The system of claim 1, further comprising generating an image comprising an attribute perturbed appearance using the target facial attribute.

13. The system of claim 12, further comprising performing facial recognition on the image comprising the attribute perturbed appearance to recognize a person therein.

14. The system of claim 1, wherein the rendering layer renders the partial texture map such that vertices of facial features having a depth above a threshold depth are rendered in the partial texture map while the vertices of the facial features having the depth equal to and less than the threshold depth are made invisible in the partial texture map.

15. The system of claim 1, wherein the TC-GAN comprises an encoder-decoder structure having an encoder and a decoder connected by skip links such that a first block of the encoder is connected to a last block of the decoder.

16. A computer-implemented method for pose-variant 3D facial attribute generation, comprising:
    directly generating, by a hardware processor using a 3D regression network, a space position map for a 3D shape and a camera perspective matrix from a single input image of a face;
    rendering, by the hardware processor using a rendering layer, a partial texture map of the single input image based on the space position map and the camera perspective matrix;
    completing, by the hardware processor using a Texture Completion Generative Adversarial Network (TC-GAN), the partial texture map to form a complete texture map based on the partial texture map and the space position map; and
    generating, by the hardware processor using a 3D Attribute generation GAN (3DA-GAN), a target facial attribute for the single input image based on the complete texture map and the space position map, wherein the TC-GAN comprises a convolutional layer followed by a batch normalization layer followed by a Rectified Linear Unit layer.

17. The computer-implemented method of claim 16, wherein the 3D regression network and the rendering layer form a first stage, and the TC-GAN and the 3DA-GAN form a second stage having a two-part stacked GAN.

18. A computer program product for pose-variant 3D facial attribute generation, the computer program product comprising a non-transitory computer readable storage medium having program instructions embodied therewith, the program instructions executable by a computer to cause the computer to perform a method comprising:

directly generating, by a hardware processor using a 3D regression network, a space position map for a 3D shape and a camera perspective matrix from a single input image of a face;

rendering, by the hardware processor using a rendering layer, a partial texture map of the single input image based on the space position map and the camera perspective matrix;

completing, by the hardware processor using a Texture Completion Generative Adversarial Network (TC-GAN), the partial texture map to form a complete texture map based on the partial texture map and the space position map; and generating, by the hardware processor using a 3D Attribute generation GAN (3DA-GAN), a target facial attribute for the single input image based on the complete texture map and the space position map, wherein the TC-GAN comprises a convolutional layer followed by a batch normalization layer followed by a Rectified Linear Unit layer.

* * * * *